(12) United States Patent
Okamatsu

(10) Patent No.: US 7,577,071 B2
(45) Date of Patent: Aug. 18, 2009

(54) TILT AMOUNT DETECTOR, TILT CORRECTOR, AND OPTICAL DISC APPARATUS

(75) Inventor: Kazuhiko Okamatsu, Chiba (JP)

(73) Assignee: Sony Corporation (JP)

( * ) Notice: Subject to any disclaimer, the term of this patent is extended or adjusted under 35 U.S.C. 154(b) by 610 days.

(21) Appl. No.: 11/393,499

(22) Filed: Mar. 30, 2006

(65) Prior Publication Data
US 2006/0227688 A1 Oct. 12, 2006

(30) Foreign Application Priority Data
Apr. 8, 2005 (JP) .............................. 2005-112217

(51) Int. Cl.
G11B 7/00 (2006.01)
(52) U.S. Cl. .................................................. 369/53.19
(58) Field of Classification Search ....................... None
See application file for complete search history.

(56) References Cited

U.S. PATENT DOCUMENTS

| 7,433,286 | B2 * | 10/2008 | Ogura et al. | ............. | 369/53.34 |
| 7,486,602 | B2 * | 2/2009 | Raaymakers | ............. | 369/53.34 |
| 2003/0227485 | A1 * | 12/2003 | Krakirian et al. | ............. | 345/771 |

* cited by examiner

*Primary Examiner*—Joseph Feild
*Assistant Examiner*—Joseph Haley
(74) *Attorney, Agent, or Firm*—Lerner, David, Littenberg, Krumholz & Mentlik, LLP (57) ABSTRACT

A tilt amount detector includes inputting means for inputting a reproduction signal supplied from an optical disc, a first filter portion and a second filter portion for correcting an optical transfer characteristic of the reproduction signal, a reference clock extracting means for extracting a reference clock signal from the input reproduction signal, a first jitter meter and a second jitter meter for measuring jitter amounts of output signals from the filter portions and the extracted reference clock signal and outputting the measured jitter amounts, and a difference calculating means for calculating a difference between the jitter amount measured by the first jitter measuring means and the jitter amount measured by the second jitter measuring means.

13 Claims, 10 Drawing Sheets

(PRIOR ART)

TILT AMOUNT DETECTOR, TILT CORRECTOR, AND OPTICAL DISC APPARATUS

CROSS-REFERENCE TO RELATED APPLICATIONS

The present application claims priority from Japanese Patent Application No. JP 2005-112217 filed on Apr. 8, 2005, the disclosure of which is hereby incorporated by reference herein.

BACKGROUND OF THE INVENTION

The present invention relates to a tilt amount detector for processing a signal which is read from an optical disc using an optical pickup and a tilt corrector for correcting tilt in accordance with a tilt amount detected by the tilt amount detector. The present invention also relates to an optical disc apparatus for implementing the tilt amount detector and the tilt corrector.

With development of an information-oriented society, there has been an increasing number of occasions where users desire to freely record/reproduce data in multiple formats using a single medium. Such data includes music data, video data, and computer application data, for example. Particularly, for disc type recording media such as CDs (Compact Discs), MDS (Mini Discs), and DVDs (Digital Versatile Discs) (each hereinafter referred to as an optical disc), further increase in capacity is demanded. Newly introduced disc formats that permit high-density recording of information have become of major interest as next-generation recording solutions.

In a recording/reproducing apparatus which uses such an optical disc mentioned above as a recording medium, a radial tilt angle and a tangential tilt angle are controlled which represent the tilt of the optical disc in a radial direction and a tangential direction, respectively, with respect to an optical spot irradiated from an optical pickup. Along with the increase in recording density, ensuring high reliability of recording/reproducing performances has become a major concern. To achieve such reliability, it is crucial to detect an amount of tilt displacement of the optical disc with high precision and control the detected tilt.

According to a known recording/reproducing apparatus, an optical pickup is moved in a positive or a negative direction so that an amount of tilt displacement can be obtained from an angle between the optical disc and the optical pickup, and an optimum tilt position is determined using the obtained tilt amount. Thus, this configuration can be implemented in conjunction with a physical arrangement which serves to move the optical pickup to detect a tilt angle of the optical pickup for achieving a smallest jitter value. Consequently, it may be impossible for an apparatus without such a physical arrangement to obtain a tilt amount after being installed with an optical pickup.

Figure 7:
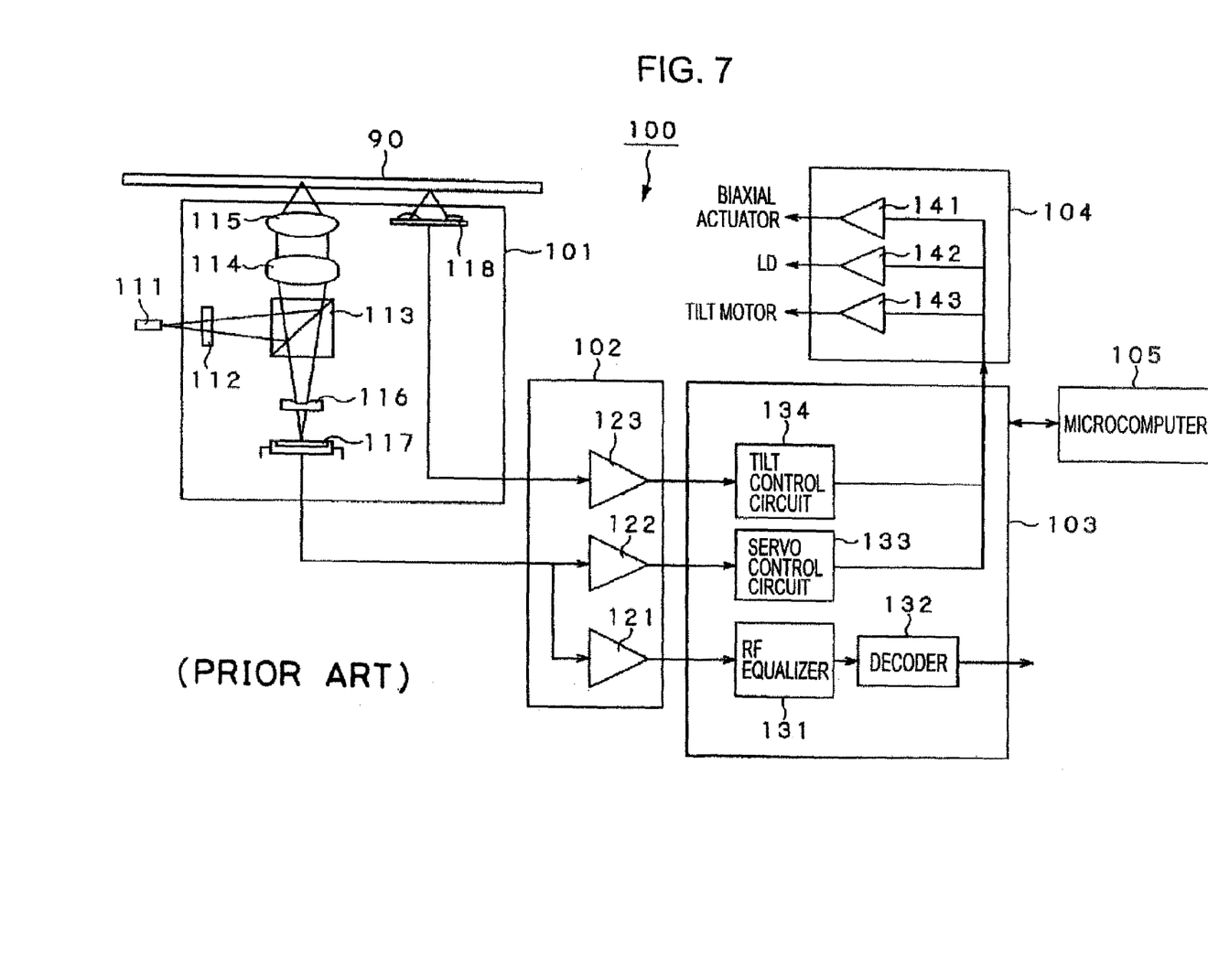
FIG. 7 is a partial block diagram illustrating part of a known optical disc apparatus.

A configuration of a known optical disc apparatus is illustrated in FIG. 7. An optical disc apparatus 100 includes an optical pickup section 101, an RF amplifier section 102, and a DSP section 103, and a driver amplifier section 104, which are integrally controlled by a microcomputer 105.

As shown in FIG. 7, the optical pickup section 101 has a laser diode (LD) 111 for irradiating predetermined recording/reproducing laser light onto an optical disc 90, a grating 112 for dividing the light beam into a plurality of light beams, a beam splitter 113 for changing the direction of a propagation path for a light beam incident from the LD 11 and also transmitting a light beam reflected from the optical disc 90, a collimator lens 114 for collimating a light beam, an objective lens 115 for converging a light beam onto a recording surface of the optical disc 90, a multi-lens 116 for converging the light beam reflected from the optical disc 90 onto a photodetector, and a photodetector 117 for converting the light beam reflected from the optical disc 90 into an electrical signal. The optical pickup section 101 includes a tilt sensor 118 for detecting a tilt angle of the optical pickup section 101.

Laser light emitted from the LD 111 is divided by the grading 112 into a plurality of light beams. Each of the light beams then passes through the beam splitter 113 and the collimator lens 114 and is converged by the objective lens 115 onto an information recording surface of the optical disc 90. The light beam reflected from the optical disc surface then travels through an optical system providing a return path in the optical pickup section 101 and enters the photodetector 17. The returning reflected beam is converted into an electrical signal by the photodetector 117. The electric signal is then transmitted to the RF amplifier section 102.

The RF amplifier section 102 includes an RF amplifier 121 for amplifying an RF signal, a servo amplifier 122, and an amplifier 123 for amplifying a signal detected by the tilt sensor 118. The DSP section 103 includes an RF equalizer 131 for correcting or adjusting the frequency characteristic or the like of an RD signal, a decoder 132 for decoding a separated component, a servo control circuit 133 for generating a servo control signal, and a tilt control circuit 134 for generating a control signal for controlling driving of a tilt motor (not shown) in accordance with the signal detected by the tilt sensor 118.

A signal output from the photodetector 117 is transmitted to the RF amplifier 121 and the servo amplifier 122 for RF signal calculation and servo signal calculation, respectively. Then, the output from the RF amplifier 121 is transmitted to the DSP section 103 for decoding a signal recoded on the optical disc 90. The output from the servo amplifier 122 is transmitted to the driver amplifier section 104. The servo signal is amplified by the amplifiers 141 and 142 and then transmitted to a biaxial actuator and an LD (not shown). The signal output by the tilt sensor 118 is amplified by the amplifier 123 and transmitted to the tilt control circuit 134. The tilt control circuit 134 generates a tilt motor control signal for controlling driving of a tilt motor (not shown). The tilt motor control signal is amplified by the amplifier 143 and transmitted to the tilt motor.

The foregoing operation is controlled by the microcomputer 105 which performs tasks associated with each circuit included in the DSP section 103 and the driver amplifier section 104, using serial/parallel signal processing. The tasks of the microcomputer 105 include providing instructions of On/Off switching, coefficient calculations, value setting, etc.

The optical pickup section 101 in FIG. 7 is generally referred to as an optical pickup (hereinafter referred to as an OP). The OP constitutes a mechanical deck for an optical disc drive in conjunction with other components such as a spindle motor, a sled motor, and a chassis which acts as driving means for rotating the optical disc 90.

In installing the OP in to the mechanical deck, in general, extremely high precision is expected with respect to the installation position and angle, particularly, in terms of a tilt direction, which is herein described as a major concern. Tilt can cause degradation of signal reproduction performance in accordance with the amount of the tilt. Tilt adjustment can be performed in accordance with a jitter value, which is widely used as an evaluation value of an RF signal.

SUMMARY OF THE INVENTION

Figure 8A:
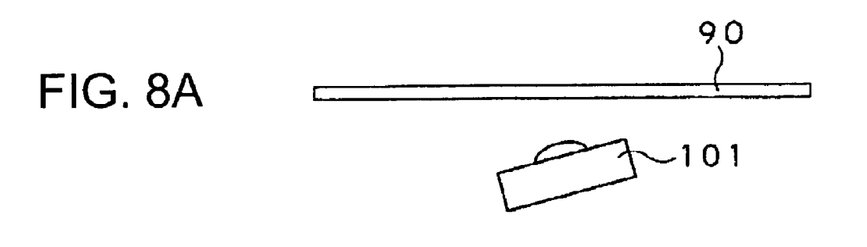
FIGS. 8A through 8C are diagrams each illustrating a tangential tilt angle provided by an optical pickup with respect to an optical disc in a known optical disc apparatus.
Figure 8B:
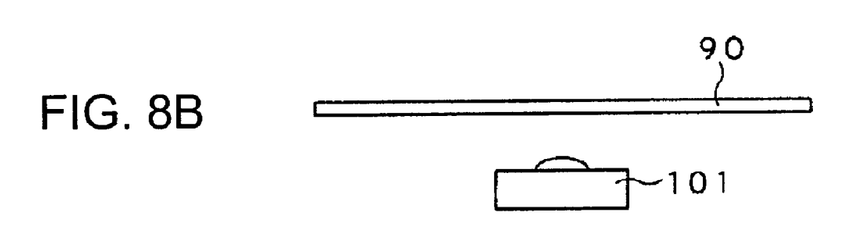
Figure 8C:
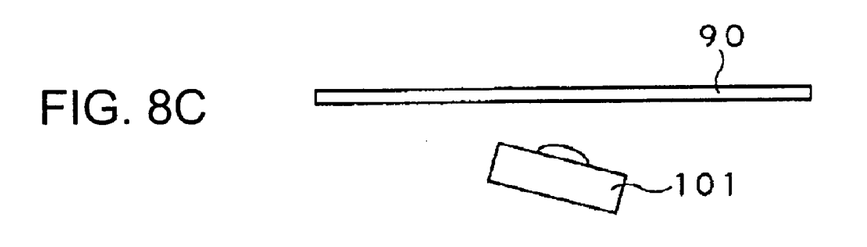
Figure 9:
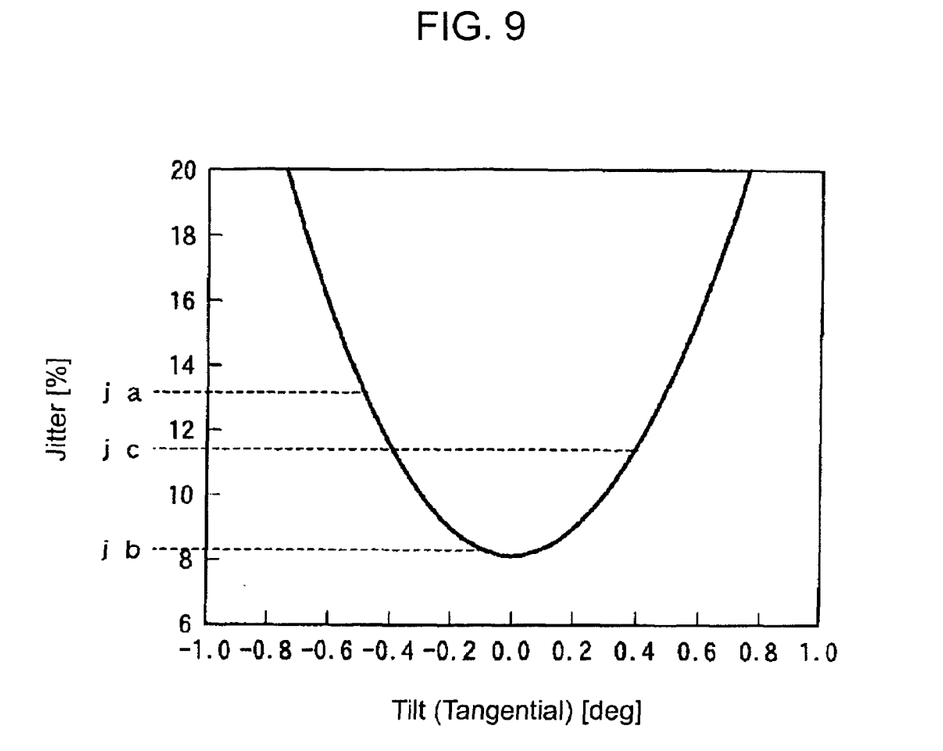
FIG. 9 is illustrates the relationship between a tangential tilt angle of an optical pickup and a jitter value in a known optical disc apparatus.

Each of FIGS. 8A through 8C illustrates inclination of the optical axis of an incident light beam from the OP with respect to a recording surface of the optical disc 90, i.e., a tangential tilt. FIG. 9 shows jitter values ja, jb, and jc corresponding to the angles of the tangential tilt of FIGS. 8A, 8B, and 8C, respectively. As illustrated in FIGS. 8A, 8B, 8C, and FIG. 9, angles are provided between the OP and the optical disc 90, so that an optimum position that produces the minimum jitter values is obtained. Tilt adjustment can be performed by controlling driving of a tilt motor in accordance with the obtained optimum position.

Figure 10:
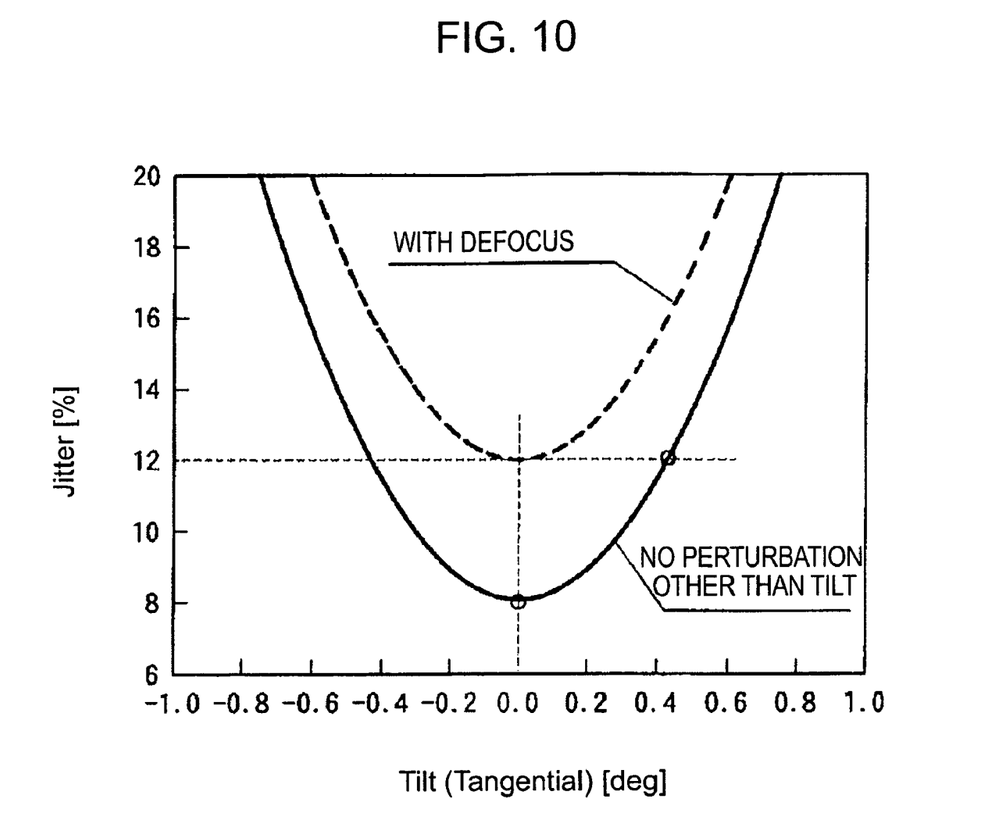
FIG. 10 illustrates the relationships between tangential tilt angles of an optical pickup and jitter values in a known optical disc apparatus, in a case where defocus is present and in a case where there is no perturbation other than tilt.

However, since the magnitude of jitter is also determined by factors other than tilt, a jitter value does not necessarily represent a skew amount. FIG. 10 shows jitter values with respect to tilt angles of an optical axis of a beam incident from an OP toward a recording surface of an optical disc. In FIG. 10, a broken line curve illustrates a case where a light beam incident from the OP is defocused on a recording track. As illustrated in FIG. 10, for example, the jitter value also increases when a light beam from the OP is defocused on a recording track. This indicates that even when there is no tilt, an obtained jitter value may erroneously indicate that tilt is present.

Therefore, in order to adjust tilt for an optimum tilt position, a technique has been employed in which a change in a jitter value is monitored using a device such as a sensor capable of detecting a tilt amount by actually tilting the OP. In this way a jitter value change attributable to tilt can be monitored and a minimum jitter value can be obtained.

To implement this technique, however, error in installing the tilt detection sensor has to be minimized, which results in a high accuracy requirement and thus an increased manufacturing cost. Moreover, for example, use of an optical disc apparatus which performs tilt adjustment after being turned on consumes much time in activating the system. This indicates that it takes a long time until a user can access functions of the optical disc apparatus such as recording/reproducing functions.

The present invention has been made in view of the above circumstance. Accordingly, there is a need for a tilt amount detector for detecting a change in a magnitude of jitter that is attributable to tilt, without physically moving an optical pickup in a tilt direction. There is also a need for a tilt corrector for correcting a tilt amount detected by the tilt amount detector to be an optimum value. Further, there is a need for an optical disc apparatus for implementing the tilt corrector to perform tilt correction.

To this end, a tilt amount detector according to an embodiment of the present invention includes: inputting means for inputting a reproduction signal supplied from an optical disc; a first filter portion for effecting correction of an optical transfer characteristic of the reproduction signal; a second filter portion for effecting correction of the optical transfer characteristic of the reproduction signal with a phase opposite to that of the correction effected by the first filter portion; reference clock extracting means for extracting a reference clock signal from the input reproduction signal; first jitter measuring means for measuring a jitter amount of each of an output signal from the first filter portion and the extracted reference clock signal and outputting the measured jitter amounts; second jitter measuring means for measuring a jitter amount of each of an output signal from the second filter portion and the extracted reference clock signal and outputting the measured jitter amounts; and difference calculating means for calculating a difference between the jitter amounts measured by the first jitter measuring means and the jitter amount measured by the second jitter measuring means.

In the tilt amount detector according to an embodiment of the present invention, in particular, the first filter portion includes a first multiplying means group and first adding means. In the first multiplying means group, a plurality of delaying means are serially connected, each providing a predetermined delay amount to a reproduction signal input from the inputting means. The first multiplying means group multiplies outputs from the individual delaying means by corresponding coefficient values. The first adding means calculates a sum of the individual outputs from the first multiplying means group. The second filter portion includes a second multiplying means group and second adding means. In the second multiplying means group, the same number of delaying means as provided in the first the first filter portion are serially connected, each providing a predetermined delay amount to the reproduction signal input from the inputting means. The second multiplying means group multiplies outputs from the individual delaying means by corresponding coefficient values. The second adding means calculates a sum of the individual outputs from the second multiplying means group.

The coefficient values by which the corresponding outputs from the delaying means in the first multiplying means group are to be multiplied and the coefficient values by which the corresponding outputs from the delaying means in the second multiplying means group are to be multiplied are arranged symmetrically either side of a center tap.

In addition, the first filter portion and the second filter portion may have shared delaying means. Tilt correction is performed by applying the above-described tilt detector to an optical pickup apparatus. Such an optical pickup apparatus includes an optical pickup which drives rotation of an optical disc and is moved by feeding means in a radial direction of the optical disc so as to carry out recording/reproducing using a light beam having a predetermined wavelength and numerical aperture. The optical disc apparatus also controls the rotation of the optical disc and the movement of the optical pickup in accordance with recording and/or reproducing operations.

According to an embodiment of the present invention, a jitter change attributable to tilt can be detected without physically moving an optical pickup in a tilt direction.

DETAILED DESCRIPTION

In an optical disc apparatus for recording/reproducing data using an optical disc, a light spot is irradiated from an optical pickup onto a recording surface of the optical disc. A deviation of the light spot on the disc surface often occurs in accordance with a radial tilt angle representing an inclination of the optical disc in a radial direction and with a tangential tilt angle representing an inclination of the optical disc in a tangential direction.

An attempt to reproduce an information signal from the optical disc using the deviated light spot brings about a situation where not only RF signal obtained at an appropriate tilt position for reproduction but also components adjacent to the RF signal are reproduced. This results in distortion of the RF signal and thus deteriorates signal reproduction performance. The signal reproduction performance can generally be indicated by an optical transfer function (OTF), since the OTF indicates a characteristic change that takes place in accordance with a tangential tilt angle. Therefore, a normal signal can be recovered from the deterioration due to a tangential tilt by compensating the characteristic change of the OTF by means of electrical processing. This electrical processing includes a filtering operation that recovers the normal signal characteristics (gain characteristic, phase characteristic) from the changed signal characteristics.

Figure 1:
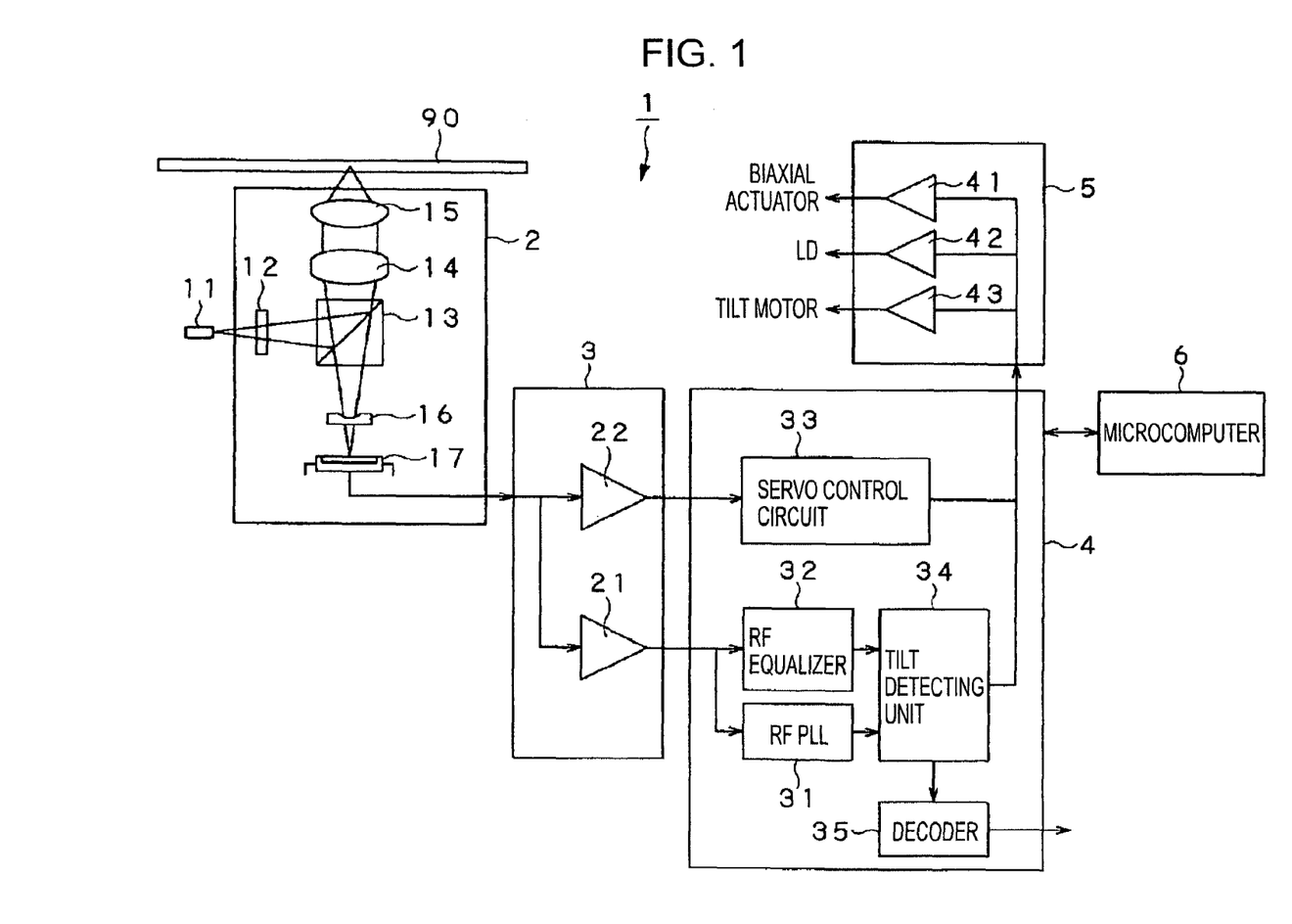
FIG. 1 a partial block diagram illustrating part of an optical disc apparatus according to an embodiment of the present invention.

In the following, embodiments of the present invention will be described in detail with reference to the attached drawings. Referring now to FIG. 1, an optical disc apparatus 1 has an optical pickup section 2, an RF amplifier section 3, a DSP section 4, and a driver amplifier section 5, which are integrally controlled by a microcomputer 6. The optical disc apparatus 1 is capable of reproducing data recorded using pits or the like on a surface of an optical disc 90 and is also capable of recording data on the surface of the optical disc 90.

The optical disc 90 may be a digital versatile disc (DVD), a compact disc (CD), etc. The optical disc apparatus 1 may be a combination drive which is compatible with both types of these optical discs.

The optical pickup section 2 includes a laser diode (LD) 11 for emitting a predetermined recording/reproducing laser light to be irradiated onto the optical disc 90, a grating 12 for dividing the light beam into a plurality of beams, and a beam splitter 13 for changing the direction of a propagation path for a light beam incident from the LD 11 and also transmitting a light beam reflected from the optical disc 90. The optical pickup section 2 also includes a collimator lens 14 for collimating a light beam, an objective lens 15 for converging a light beam onto the recording surface of the optical disc 90, a multi-lens 16 for converging a reflected light beam onto a photodetector, and a photodetector 17 for converting a light beam reflected from the recording surface of the optical disc 90 into an electrical signal.

A laser light beam emitted from the LD 11 is divided into a plurality of beams. Each divided light beam propagates through the beam splitter 13 and collimator lens 14 and then is converged by the objective lens 15 onto an information recording surface of the optical disc 90. The converged light beam, reflected from the disc surface, propagates through an optical system providing a return path in the optical pickup and enters the photodetector 17. The returning reflected beam is converted into an electrical signal by the photodetector 17. The electric signal is then transmitted to the RF amplifier section 3.

The RF amplifier 3 includes an RF amplifier 21 and a servo amplifier 22 for amplifying an RF signal. The DSP section 4 includes an RF PLL (phase lock loop) circuit 31, an RF equalizer 32 for correcting or changing a frequency characteristic or the like of the RF signal, and a servo control circuit 33 for generating a servo control signal.

In this embodiment, the optical disc apparatus 1 is also provided with a tilt detecting unit 34 arranged between the RF equalizer 32 and the RF PLL circuit 31, and a decoder 35 for decoding a separated component, which are included in the DSP section 4. The tilt detecting unit 34 compensates characteristic deterioration of a reproduced RF signal which is indicated by the OTF using electric processing and recovers normal signal characteristics, such as gain characteristic and phase characteristic, from the deteriorated signal characteristics.

The RF signal output from the photodetector 17 is transmitted to the RF amplifier 21 and the servo amplifier 22 for RF signal calculation and servo signal calculation, respectively. Then, the output from the RF amplifier 121 is transmitted to the DSP section 4 for signal processing. The signal output from the servo amplifier 22 is transmitted to the servo control circuit 33 in the DSP section 4 so as to be converted into a control signal for driving a servo mechanism. The converted signal is then transmitted to the driver amplifier section 5 and is amplified by an amplifier 41 and an amplifier 42. The amplified signals from the amplifier 41 and the amplifier 42 are transmitted to a biaxial actuator (not shown) and an LD 11, respectively.

The tilt detecting unit 34 obtains an amount of tilt from the RF signal and generates a tilt motor control signal for controlling driving of a tilt motor (not shown). The tilt motor control signal is amplified by the amplifier 43 and transmitted to the tilt motor.

The operations described above are controlled by the microcomputer 6 which provides instructions on On/Off switching, coefficient calculations, value setting, etc. to each circuit in the DSP section 3 and the driver amplifier section 5, using serial/parallel signal processing.

Figure 2:
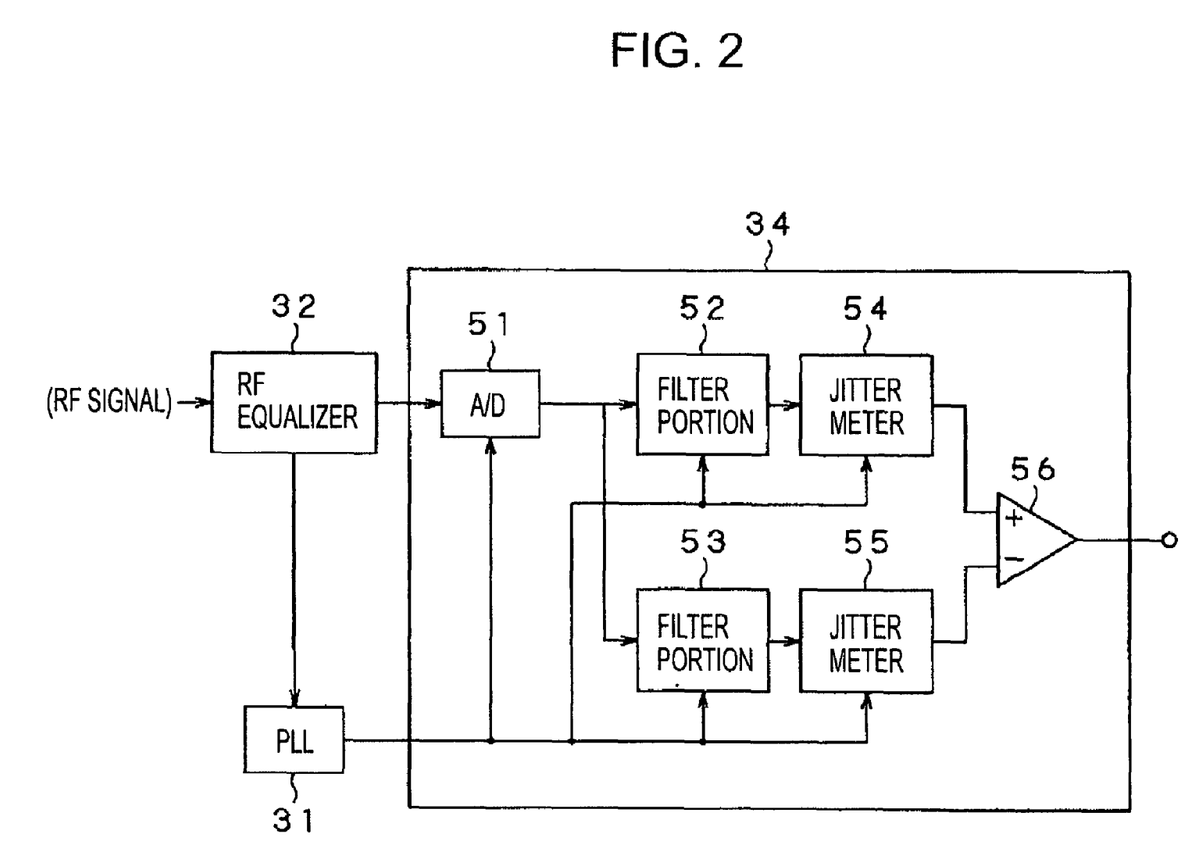
FIG. 2 is a block diagram illustrating a tilt detecting unit of the optical disc apparatus.

Referring now to FIG. 2, the tilt detecting unit 34 will be described which carries out a filtering operation so as to compensate characteristic deterioration of the OTF and recover a normal signal from deterioration.

In the tilt detecting unit 34, as shown in FIG. 2, an A/D converter 51 performs analog-digital conversion on an output signal from the RF equalizer 32. Then, a first filter portion 52 corrects an optical transfer characteristic of the reproduction signal digitally converted by the A/D converter 51. On the other hand, a second filter portion 53 corrects the optical transfer characteristic of the digitally converted reproduction signal from the A/D converter 51 in an opposite phase with respect to the first filter portion 52. A jitter meter 54, served as first jitter measuring means, measures amounts of jitter of an output signal from the first filter portion 52 and of a reference clock. On the other hand, a jitter meter 55, served as second jitter measuring means, measures jitter amounts of an output signal from the second filter portion 53 and of the reference clock. A subtractor 56, served as difference calculation means, calculates a difference between the respective jitter amounts measured by the jitter meters 54 and 55.

The first filter portion 52 and the second filter portion 53 of the tilt detecting unit 34 may employ a FIR filter or an IIR filter. Hereinafter in this embodiment, the FIR filter is employed since it facilitates sharing of a tap coefficient. The tilt detecting unit 34 may be provided with a clock delay circuit at a stage subsequent to the RF PLL circuit 31 and immediately preceding the A/D converter 51, for providing a predetermined delay amount to the reference clock extracted by the RF PLL circuit 31.

In the following, configurations of the first filter portion 52 and the second filter portion 53 will be described in detail. The first filter portion 52 and the second filter portion 53 apply to the optical transfer function (OTF) of an input RF signal such a characteristic change that contains temporally adjacent waveform components. Each of the first and second filter portions 52 and 53 has such a circuitry configuration as to provide an appropriate delay to the RF signal, multiply the delayed RF signal with an appropriate coefficient value, and add the signals together each of which has sequentially been delayed and multiplied with the coefficient value.

Figure 3:
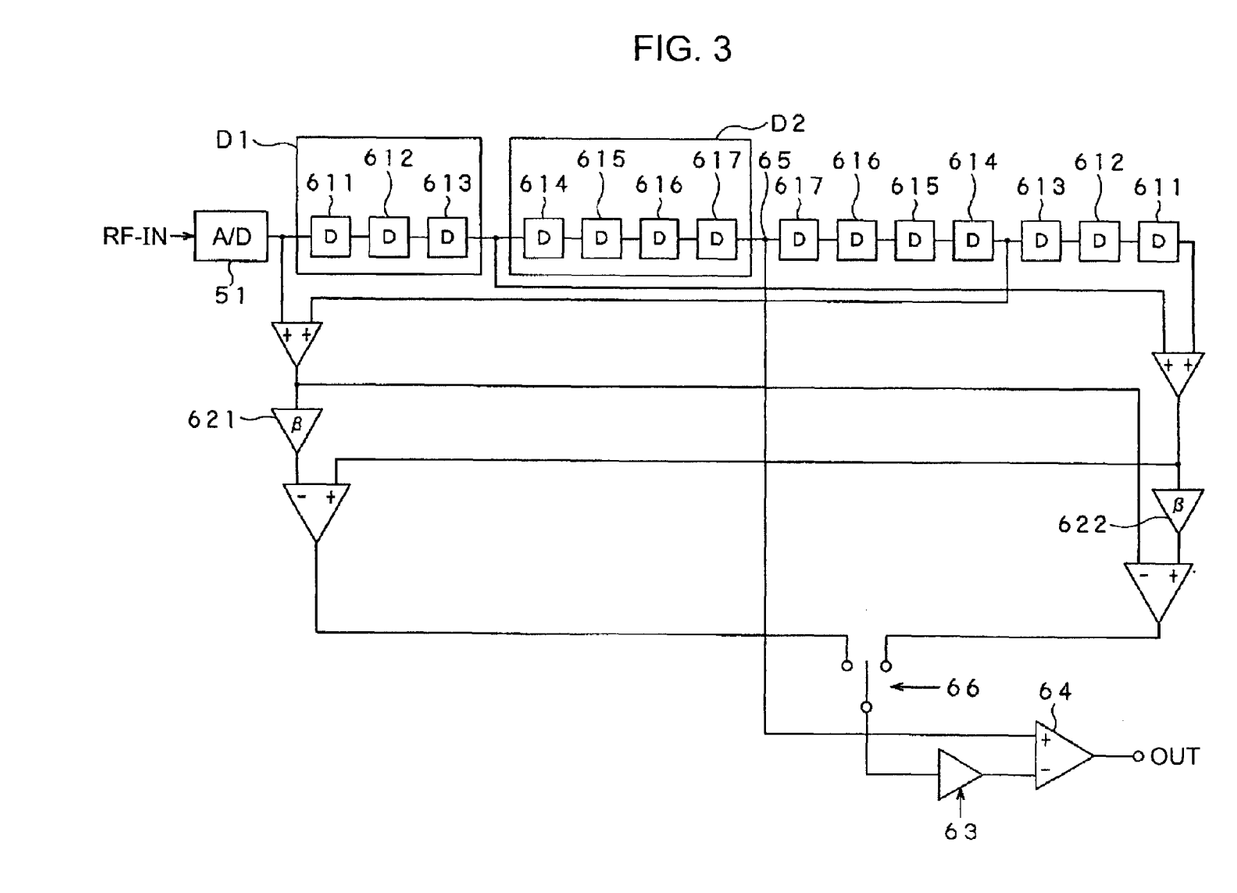
FIG. 3 is a circuit configuration diagram illustrating an exemplary circuit configuration applicable to a filter portion of the tilt detection section.

FIG. 3 illustrates an exemplary circuitry configuration which may be applied to each filter portion of the tilt detecting unit 34. In this embodiment, this circuitry is formed of a transversal filter which is one type of digital filters having gain and phase characteristics used in correcting signal distortion.

This filter includes a delay circuit group D1 having serially connected delay circuits 611, 612, and 613, each providing a predetermined delay to the digitally converted RF signal and a delay circuit group D2 having serially connected delay circuits 614, 615, 616, and 617. The filter also includes multipliers 621 and 622 for multiplying an output signal from each delay circuit group by a corresponding coefficient value and a multiplier 63 for weighting each signal that has passed through the delay circuit groups D1 and D2 and been sequentially delayed. In addition, the filter includes an adder 64 for adding the weighted signal with the delayed signal.

Switching the switch 66 in the filter shown in FIG. 3 can output a signal representing a characteristic change in the OTF which corresponds to a state in which an arbitrary amount of tilt is applied to a digitally converted RF signal. Since the OTF is responsive to a tilt angle, the RF signal, to which the filter provides the OTF characteristic changes (or correction in certain circumstances) in amplitude and phase frequency characteristics, corresponds to an RF signal obtained when a tilt angle is applied. Then, two filter configurations are arranged, one of which corresponds to an OTF representing a state in which an amount of tilt is applied in a positive direction, and another of which corresponds to an OTF representing a state in which the same amount of tilt is applied in a negative direction. With this arrangement, a tilt amount of an optical disc can be measured by comparing deterioration levels of each RF signals that have passed through the respective filters. Therefore, provided that the symmetrical tilts (positive, negative) with respect to a current tilt position have the same swing ranges, the two filter configurations as shown in FIG. 3 can apply an identical weighting coefficient K regardless of tilt polarity and be arranged symmetrically either side a center tap 65.

Thus, the circuitry configuration illustrated in FIG. 3 can apply the identical coefficient K and calculate a difference between jitter values of RF signal output from the respective filter configurations in accordance with switching of the switch 66, thereby determining a tilt amount.

Figure 4:
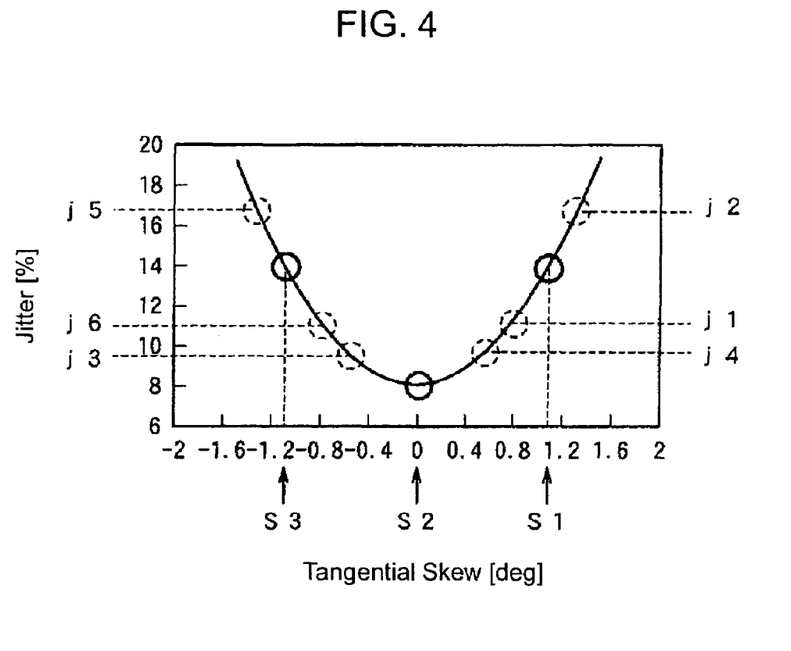
FIG. 4 shows a jitter amount with respect to a tangential tilt angle.

FIG. 4 shows a jitter amount with respect to a tangential tilt angle. For example, it can be seen that a current tilt position corresponds to a skew angle S1 which is obtained from a difference between jitter values j1 and j2 of each RF signal output from the respective two filter configurations in accordance with switching of the switch 66. Similarly, jitter values j3 and j4 correspond a current tilt position S2, and jitter values j5 and j6 correspond a current tilt position S3.

Figure 5:
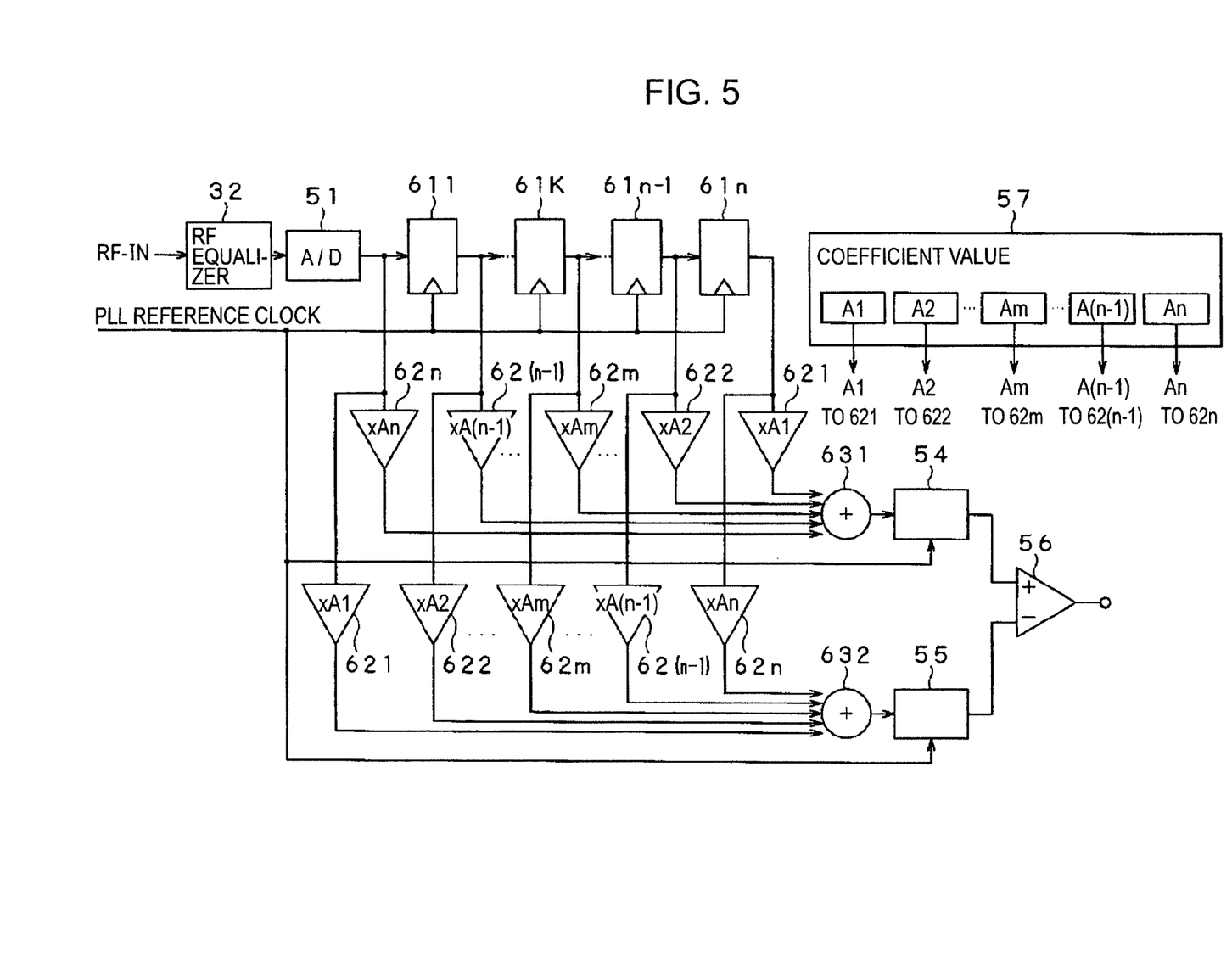
FIG. 5 is a circuit configuration diagram illustrating an example of the tilt detecting unit in detail.

Referring to FIG. 5, a further detail of the exemplary filter arrangement of the tilt detecting unit 34 as shown in FIG. 3 according to an embodiment of the present invention will be described.

The tilt detecting unit 34 illustrated in FIG. 5 includes: a delay circuit group composed of delay circuits 611, ..., 61K, ..., 61(n−1), ..., to 61n; a first multiplier group composed of multipliers 621, 622, ..., 62m, ..., 62(n−1) to 62n for multiplying each delayed RF signal output from the respective delay circuits by coefficient values A1, A2, ..., Am, ..., A(n−1) to An, respectively; and an adder 631 for adding each signal weighted by the respective multipliers and a reference clock signal. In addition, the tilt detecting unit 34 includes: a second multiplier group composed of multipliers 621, 622, ..., 62m, ..., 62(n−1) to 62n for multiplication which are arranged so as to superimpose output signals on output signals of the first multiplier group in an opposite manner with respect to the first multiplier group; and an adder 632 for adding each signal weighted by the respective multipliers and a reference clock signal. Further the tilt detecting unit 34 is provided with a register 57 in which the coefficient values A1, A2, ..., Am, ..., A(n−1) to An are stored.

Subsequently, jitter meters 54' and 55, each measuring jitter amounts of a reference clock signal extracted from the RF signal and of the RF signal that has undergone a filtering operation, are connected at subsequent stages to the respective filter configurations. The output from the adder 631 is supplied to the jitter meter 54, and the output from the adder 632 is supplied to the jitter meter 55. Then, a subtractor 56 calculates the difference between the jitter amounts measured by the respective jitter meters.

The tilt detecting unit 34 having such an arrangement described above employs a shared delay circuit group that constitutes the two filter portions illustrated in FIGS. 2 and 3. This tilt detecting unit 34 can also have the register 57 shared for storing coefficient values. Thus, the tilt detecting unit 34 in this embodiment permits sharing of a plurality of delay circuits and tap coefficient values, since two filter portions 52 and 53 can be arranged symmetrically either side of the center tap.

Each of the coefficient values supplied to the respective multipliers can be either negative, positive, or zero. Selecting an optimum value for each multiplier can allow for such a circuitry configuration as illustrated in FIG. 3. Thus, in the tilt detecting unit 34 illustrated in FIG. 5, part of difference calculation, the calculation of the coefficient K, etc. are implemented using combinations of the coefficient values for the corresponding multipliers.

Multiple combinations of the coefficient values may be provided in the register 57. For example, when the optical disc apparatus 1 is a combination drive that is compatible with a multiple types of optical discs such as a DVD and a CD, a combination of the coefficient values corresponding to a given format can appropriately be selected and supplied to the multipliers.

As described above, the tilt detecting unit 34 illustrated in FIG. 5 is capable of detecting a current tilt angle from a difference between RF signal jitter values as shown in FIG. 4, by applying an appropriate combination of the coefficient values stored in the register 57 to the corresponding multipliers.

Figure 6:
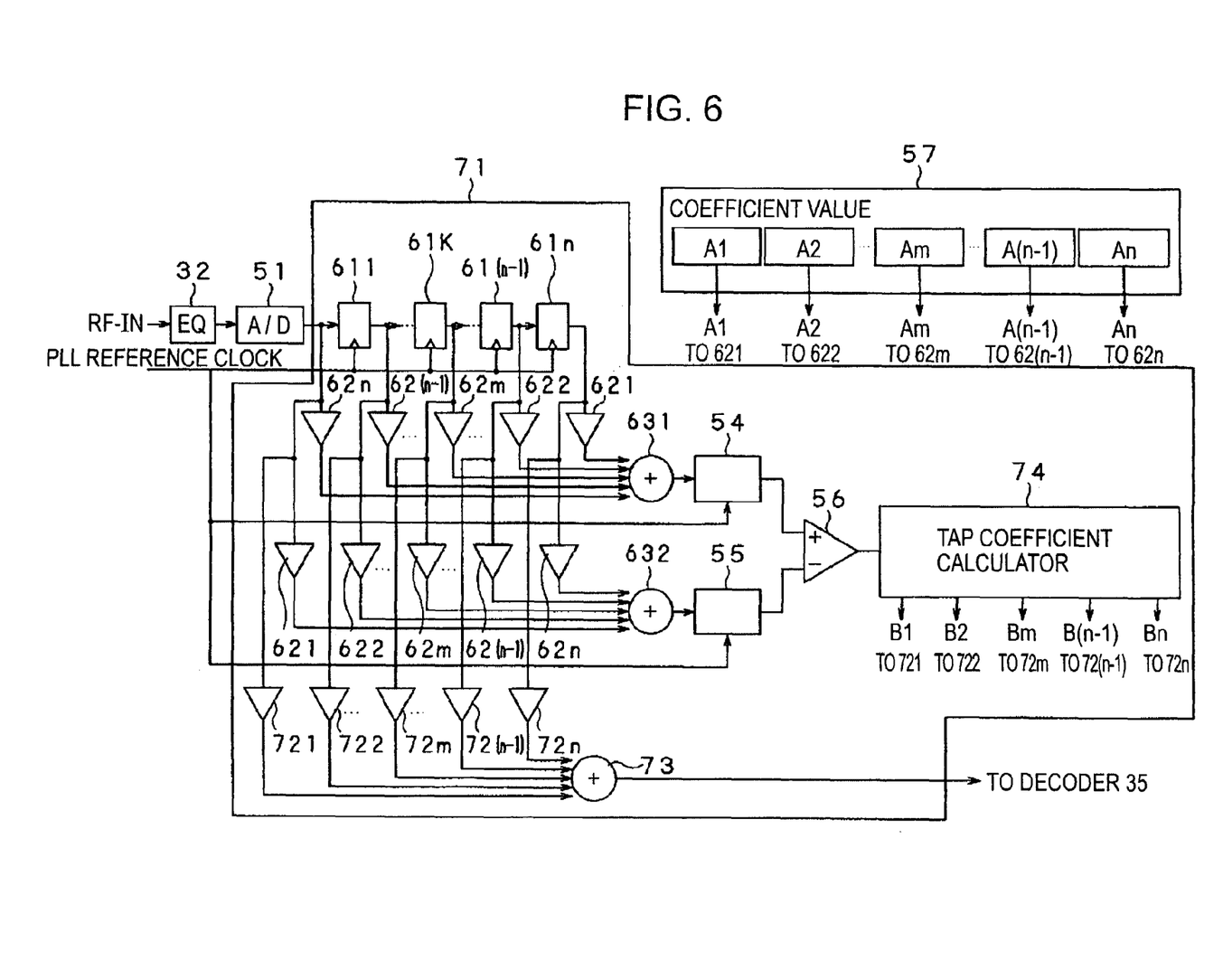
FIG. 6 is a block diagram illustrating a tilt correcting unit which applies the tilt detecting unit.

FIG. 6 illustrates a tilt correcting unit 71 having an arrangement which applies the tilt detecting unit 34 of FIG. 5. The tilt correcting unit 71 has a filter for correcting a tilt in accordance with a tilt amount detected using the circuitry of FIG. 5.

The tilt correcting unit 71 includes: a delay circuit group composed of delay circuits 611, . . . , 61K, . . . , 61($n$–1), . . . to 61$n$; multipliers 621, 622, . . . , 62$m$, . . . , 62($n$–1) to 62$n$ for multiplying each delayed RF signal output from the respective delay circuits by coefficient values A1, A2, . . . , Am, . . . , A(n–1) to An, respectively; and an adder 631 for adding each signal weighted by the respective multipliers and a reference clock signal. The tilt correcting unit 71 further includes: multipliers 721, 722, . . . , 72$m$, . . . , 72($n$–1), to 72$n$ for performing weighting to correct characteristic deterioration (according to OTF) of the RF signal obtained after the A/D conversion; an adder 731 for calculating the sum of the signals weighted by the respective multipliers; and a tap coefficient calculator 74 for calculating a filter coefficient to be supplied to each of the multipliers in accordance with the tilt amount detected using the circuitry of FIG. 6.

The tap coefficient calculator 74 determines tap coefficients to be supplied to the respective multipliers, and input the determined tap coefficients B1, B2, . . . , Bm, . . . , B(n–1), to Bn to the multipliers 721, 722, . . . , 72$m$, . . . , 72($n$–1), to 72$n$, respectively. The signals weighted by the respective multiplier are summed by the adder 73 and extracted as a jitter-corrected signal. Thus, the tilt correcting unit 71 calculates coefficient values for correcting the OTF of the RF signal which is responsive to the amount of tilt displacement detected by such an arrangement as described using the tilt detecting unit 34, thereby correcting the jitter values to be a normal value without mechanically moving the OP in a tilt directions.

In addition, the tilt correcting unit 71 may have, instead of the tap coefficient calculator 74, a control signal in a table for correcting tilt displacement in accordance with a tilt amount.

As described above, applying the tilt detecting unit 34 according to an embodiment of the present invention to an optical disc apparatus enables detection of a tilt amount, even if the optical disc apparatus has an OP tilted in a fixed direction with respect to an optical disc. Moreover, the tilt detecting unit 34 can detect an amount of tilt displacement within a reduced time period, compared with the technique mentioned above which mechanically inclines the OP so as to detect the tilt amount by processing an RF signal. Further, the detected tilt can be corrected using a signal representing the tilt amount calculated by the tilt detecting unit 34 according to an embodiment of the present invention. This correction operation permits the production of an optimum RF signal without a mechanism for swinging the OP in a tilt direction and an associated detecting sensor, thereby contributing to miniaturization and weight saving. Furthermore, as illustrated in an embodiment of the present invention, sharing of a delay circuit in a filter portion, a tap coefficient, etc. permits further reduction of circuit size.

The optical disc apparatus 1 provided with the tilt detecting unit described above is only an example of optical disc apparatuses in which the present invention may be embodied, and various modifications may be made within a scope that does not change the gist of the present invention. For example, each filter characteristic to be provided to an RF signal can be optimized in accordance with characteristics of an optical pickup, including the recording format, such as pit recording and phase-change type recording, the numerical aperture (NA) of the objective lens, and the wavelength of the light beam to be applied. Specifically, not only the digital filter described above, but an analogue filter having similar characteristics similar to those of the digital filter can also be employed. When a digital filter is applied to the optical disc apparatus according to an embodiment of the present invention, an IIR filter may be implemented, as well as the above FIR filter. However, the FIR filter has a significant advantage over the IIR filter in facilitating the sharing of a tap coefficient, thereby being considered more practical.

In the above description, a case is illustrated where two jitter meters are used for evaluating RF signals. However, instead of the jitter meters for measuring jitter, any component that serves to indicate a change in a RF characteristic that is responsive to tilt can be applied. For example, for evaluating the RF signal, a bit error rate counter or, depending on a configuration of an RF decoding unit, a SAM (Sequence Amplitude Margin) or the like may be applied. In this case, although a time interval for each evaluation value output varies, a tap coefficient value for tilt correction may be updated at a timing when the evaluation value is output.

It should be understood by those skilled in the art that various modifications, combinations, sub-combinations and alterations may occur depending on design requirements and other factors insofar as they are within the scope of the appended claims or the equivalents thereof.

The invention claimed is:

1. A tilt amount detector for detecting tilt displacement of an optical pickup with respect to an optical disc, the tilt amount detector comprising:

inputting means for inputting a reproduction signal supplied from an optical disc;

a first filter portion for effecting correction of an optical transfer characteristic of the reproduction signal;

a second filter portion for effecting correction of the optical transfer characteristic of the reproduction signal with a phase opposite to that of the correction effected by the first filter portion;

reference clock extracting means for extracting a reference clock signal from the input reproduction signal;

first jitter measuring means for measuring a jitter amount of each of an output signal from the first filter portion and the extracted reference clock signal and outputting the measured jitter amounts;

second jitter measuring means for measuring a jitter amount of each of an output signal from the second filter portion and the extracted reference clock signal and outputting the measured jitter amounts; and difference calculating means for calculating a difference between the jitter amount measured by the first jitter measuring means and the jitter amount measured by the second jitter measuring means.

2. The tilt amount detector of claim 1, wherein the first filter portion includes a first multiplying means group and first adding means, the first multiplying means group having a plurality of serially connected delaying means each providing a predetermined delay amount to the reproduction signal input from the inputting means and multiplying outputs from the individual delaying means by corresponding coefficient values, the first adding means calculating a sum of the individual outputs from the first multiplying means group, wherein the second filter portion includes a second multiplying means group and second adding means, the second multiplying means group having the same number of serially connected delaying means as provided in the first filter portion, each providing a predetermined delay amount to the reproduction signal input from the inputting means and multiplying outputs from the individual delaying means by corresponding coefficient values, the second adding means calculating a sum of the individual outputs from the second multiplying means group, wherein the coefficient values by which the corresponding outputs from the delaying means in the first multiplying means group are to be multiplied and the coefficient values by which the corresponding outputs from the delaying means in the second multiplying means group are to be multiplied are arranged symmetrically either side of a center tap.

3. The tilt amount detector of claim 1, wherein the first filter portion and the second filter portion share the delaying means.

4. The tilt amount detector of claim 1, further comprising frequency characteristic correcting means provided at a stage immediately preceding the inputting means, for correcting a frequency characteristic of the reproduction signal.

5. The tilt amount detector of claim 1, further comprising storing means for storing the coefficient values to be supplied to the delaying means, wherein the storing means is shared by the first filter portion and the second filter portion, and a connection for inputting the coefficient values from the storing means to the individual multiplying means of the first filter portion and a connection for inputting the coefficient values from the storing means to the individual multiplying means of the second filter portion are symmetrically arranged either side of a center tap.

6. A tilt corrector for correcting tilt displacement of an optical pickup with respect to an optical disc, the tilt corrector comprising:
   inputting means for inputting a reproduction signal supplied from the optical disc;
   a first filter portion for effecting correction of an optical transfer characteristic of the reproduction signal;
   a second filter portion for effecting correction of the optical transfer characteristic of the reproduction signal with a phase opposite to that of the correction effected by the first filter portion;
   reference clock extracting means for extracting a reference clock signal from the input reproduction signal;
   first jitter measuring means for measuring a jitter amount of each of an output signal from the first filter portion and the extracted reference clock signal and outputting the measured jitter amounts;
   second jitter measuring means for measuring a jitter amount of each of an output signal from the second filter portion and the extracted reference clock signal and outputting the measured jitter amounts; and
   difference calculating means for calculating a difference between the jitter amount measured by the first jitter measuring means and the jitter amount measured by the second jitter measuring means; and
   tilt controlling means for generating a control signal for correcting tilt of the optical pickup in accordance with a tilt amount represented by the difference calculated by the difference calculating means.

7. The tilt corrector of claim 6, wherein the first filter portion includes a first multiplying means group and first adding means, the first multiplying means group having a plurality of serially connected delaying means each providing a predetermined delay amount to the reproduction signal input from the inputting means and multiplying outputs from the individual delaying means by corresponding coefficient values, the first adding means calculating a sum of the individual outputs from the first multiplying means group,
wherein the second filter portion includes a second multiplying means group and second adding means, the second multiplying means group having the same number of serially connected delaying means as provided in the first filter portion, each providing a predetermined delay amount to the reproduction signal input from the inputting means and multiplying outputs from the individual delaying means by corresponding coefficient values, the second adding means calculating a sum of the corresponding outputs from the second multiplying means group,
wherein the coefficient values by which the corresponding outputs from the delaying means in the first multiplying means group are to be multiplied and the coefficient values by which the corresponding outputs from the delaying means in the second multiplying means group are to be multiplied are arranged symmetrically either side of a center tap.

8. The tilt corrector of claim 6, wherein the tilt controlling means calculates each of the coefficient values which minimizes the difference calculated by the difference calculation means.

9. The tilt corrector of claim 8, wherein each of the first jitter measuring means and the second jitter measuring means measures a jitter value at a predetermined time interval, wherein the tilt controlling means calculates a difference value using the difference calculating means, and wherein the tilt controlling means updates each of the coefficient values in accordance with the calculated difference value.

10. An optical disc apparatus having an optical pickup which drives rotation of an optical disc and is moved by feeding means in a radial direction of the optical disc so as to carry out recording/reproduction using a light beam having a predetermined wavelength and a numerical aperture and controlling the rotation of the optical disc and the movement of the optical pickup in accordance with recording and/or reproduction operations, the optical disc apparatus comprising:
   a tilt detecting unit for correcting tilt displacement of the optical pickup with respect to the optical disc, the optical pickup having a light source for emitting a light beam, an objective lens for converging the light beam onto the optical disc, light receiving means for receiving a light beam reflected on the optical disc and converting the received reflected beam into an electric signal, the tilt detecting unit including,
   inputting means for inputting a reproduction signal supplied from an optical disc,
   a first filter portion for effecting correction of an optical transfer characteristic of the reproduction signal,
   a second filter portion for effecting correction of the optical transfer characteristic of the reproduction signal with a phase opposite to that of the correction effected by the first filter portion,
   reference clock extracting means for extracting a reference clock signal from the input reproduction signal,
   first jitter measuring means for measuring a jitter amount of each of an output signal from the first filter portion and the extracted reference clock signal and outputting the measured jitter amounts,
   second jitter measuring means for measuring a jitter amount of each of an output signal from the second filter portion and the extracted reference clock signal and outputting the measured jitter amounts,
   difference calculating means for calculating a difference between the jitter amount measured by the first jitter measuring means and the jitter amount measured by the second jitter measuring means, and tilt controlling means for generating a control signal for correcting tilt of the optical pickup in accordance with a tilt amount represented by the difference calculated by the difference calculating means.

11. A tilt amount detector detecting tilt displacement of an optical pickup with respect to an optical disc, the tilt amount detector comprising:
- an input unit inputting a reproduction signal supplied from an optical disc;
- a first filter portion effecting correction of an optical transfer characteristic of the reproduction signal;
- a second filter portion effecting correction of the optical transfer characteristic of the reproduction signal with a phase opposite to that of the correction effected by the first filter portion;
- a reference clock extracting unit extracting a reference clock signal from the input reproduction signal;
- a first jitter meter measuring a jitter amount of each of an output signal from the first filter portion and the extracted reference clock signal and outputting the measured jitter amounts;
- a second jitter meter measuring a jitter amount of each of an output signal from the second filter portion and the extracted reference clock signal and outputting the measured jitter amounts; and
- a difference calculator calculating a difference between the jitter amount measured by the first jitter measuring means and the jitter amount measured by the second jitter measuring means.

12. A tilt corrector correcting tilt displacement of an optical pickup with respect to an optical disc, the tilt corrector comprising:
- an inputting unit inputting a reproduction signal supplied from the optical disc;
- a first filter portion for effecting correction of an optical transfer characteristic of the reproduction signal;
- a second filter portion for effecting correction of the optical transfer characteristic of the reproduction signal with a phase opposite to that of the correction effected by the first filter portion;
- a reference clock extracting unit extracting a reference clock signal from the input reproduction signal;
- a first jitter meter measuring a jitter amount of each of an output signal from the first filter portion and the extracted reference clock signal and outputting the measured jitter amounts;
- a second jitter meter measuring a jitter amount of each of an output signal from the second filter portion and the extracted reference clock signal and outputting the measured jitter amounts;
- a difference calculator calculating a difference between the jitter amount measured by the first jitter measuring means and the jitter amount measured by the second jitter measuring means; and
- a tilt controller generating a control signal for correcting tilt of the optical pickup in accordance with a tilt amount represented by the difference calculated by the difference calculating means.

13. An optical disc apparatus having an optical pickup which drives rotation of an optical disc and is moved by a feeder in a radial direction of the optical disc so as to carry out recording/reproduction using a light beam having a predetermined wavelength and a numerical aperture and controlling the rotation of the optical disc and the movement of the optical pickup in accordance with recording and/or reproduction operations, the optical disc apparatus comprising:
- a tilt detecting unit correcting tilt displacement of the optical pickup with respect to the optical disc, the optical pickup having a light source emitting a light beam, an objective lens converging the light beam onto the optical disc, a light receiver receiving a light beam reflected on the optical disc and converting the received reflected beam into an electric signal, the tilt detecting unit including,
- an input unit inputting a reproduction signal supplied from an optical disc,
- a first filter portion effecting correction of an optical transfer characteristic of the reproduction signal,
- a second filter portion effecting correction of the optical transfer characteristic of the reproduction signal with a phase opposite to that of the correction effected by the first filter portion,
- a reference clock extracting unit extracting a reference clock signal from the input reproduction signal,
- a first jitter meter measuring a jitter amount of each of an output signal from the first filter portion and the extracted reference clock signal and outputting the measured jitter amounts,
- a second jitter meter measuring a jitter amount of each of an output signal from the second filter portion and the extracted reference clock signal and outputting the measured jitter amounts,
- a difference calculator calculating a difference between the jitter amount measured by the first jitter measuring means and the jitter amount measured by the second jitter measuring means, and
- a tilt controller generating a control signal for correcting tilt of the optical pickup in accordance with a tilt amount represented by the difference calculated by the difference calculating means.

* * * * *